(12) United States Patent
Khouri et al.

(10) Patent No.: US 6,906,168 B2
(45) Date of Patent: Jun. 14, 2005

(54) PROCESS FOR FRACTIONATION/CONCENTRATION TO REDUCE THE POLYDISPERSIVITY OF POLYMERS

(75) Inventors: Farid Fouad Khouri, Clifton Park, NY (US); Paul Edward Howson, Latham, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/647,678

(22) Filed: Aug. 25, 2003

(65) Prior Publication Data

US 2005/0049392 A1 Mar. 3, 2005

(51) Int. Cl.⁷ ............................... C08F 6/00; C08F 6/06

(52) U.S. Cl. ...................... 528/480; 528/491; 528/493; 528/494; 528/497; 528/500 R; 528/503

(58) Field of Search ................................. 528/480, 491, 528/493, 494, 497, 502 R, 503

(56) References Cited

U.S. PATENT DOCUMENTS

| | | | |
|---|---|---|---|
| 4,217,438 A | | 8/1980 | Brunelle et al. |
| 4,879,419 A | * | 11/1989 | Johannessen ................ 568/606 |
| 5,229,482 A | | 7/1993 | Brunelle |
| 5,264,536 A | | 11/1993 | Radosz |
| 5,830,974 A | | 11/1998 | Schmidhauser et al. |
| 5,910,559 A | * | 6/1999 | Rahman et al. .............. 528/137 |
| 6,166,137 A | | 12/2000 | Brown et al. |
| 6,235,866 B1 | * | 5/2001 | Khouri et al. .............. 528/125 |
| 6,417,255 B1 | | 7/2002 | Penning et al. |
| 6,630,568 B1 | * | 10/2003 | Johnson et al. ............. 528/486 |

OTHER PUBLICATIONS

PCT Search Report–Dec. 27, 2004.

* cited by examiner

*Primary Examiner*—James J. Seidleck
*Assistant Examiner*—Irina S. Zemel
(74) *Attorney, Agent, or Firm*—Carter, DeLuca Farrell & Schmidt LLP (57) ABSTRACT

Methods of reducing the amount of undesirable by-products in the production of polymers are disclosed. The resulting polyetherimides have lower polydispersivity and enhanced thermomechanical properties. In some embodiments, cyclic and low molecular weight linear oligomers are also obtained.

23 Claims, 2 Drawing Sheets

PROCESS FOR FRACTIONATION/CONCENTRATION TO REDUCE THE POLYDISPERSIVITY OF POLYMERS

BACKGROUND OF THE INVENTION

The present disclosure is directed to methods for reducing the levels of cyclic oligomers produced during the formation of polyetherimide resins. More particularly, a fast and efficient fractionation method is disclosed to reduce the polydispersivity of the polyetherimide resins without having to precipitate the desired polyetherimide in solid form. Another aspect of this invention is to concentrate cyclic oligomers for further use in other applications.

Polymerization reactions typically lead to products of varying polydispersivity or polydispersity, i.e., having a range of components from low to high molecular weight. The quality of a final polymeric product depends to a large extent on how broad its molecular weight distribution is (in most cases, the broader the distribution, the lower the quality). Polydispersivity is expressed as the polydispersivity index (PDI), which is the ratio of the weight average molecular weight (Mw) to the number average molecular weight (Mn).

In many polymerization reactions, undesirable low molecular weight by-products and unreacted monomers remain in the final product. Such by-products and unreacted monomers can have adverse effects on the properties of the desired polymers and thus must be separated.

For example, aromatic polyethers, particularly polyetherimides, are important engineering resins because of their excellent properties. These polymers may be produced by various methods including the condensation polymerization of a diamine and a dianhydride as in the reaction of m-phenylene diamine (mPD) and bisphenol-A dianhydride (BPADA). The resulting polyetherimides have a polydispersivity of about 2.2.

Alternatively, polyetherimides may be prepared by a displacement polymerization process which reacts salts of dihydroxyaromatic compounds, such as bisphenol A disodium salt (BPA.Na$_2$), with dihaloaromatic molecules. For example, polyetherimides are conveniently prepared by the reaction of salts of dihydroxyaromatic compounds with bis(halophthalimides) as illustrated by 1,3-bis[N-(4-chlorophthalimido)]benzene (hereinafter sometimes "CIPAMI"), which has the structure

CIPAMI (I)

The bis(halophthalimides), in turn, are produced by reacting at least one diamino compound, preferably an aromatic diamine such as mPD or p-phenylenediamine (pPD), and at least one halophthalic anhydride.

According to U.S. Pat. Nos. 5,229,482 and 5,830,974, the preparation of aromatic polyethers may be conducted in solution in relatively non-polar solvents, using a phase transfer catalyst which is substantially stable under the temperature conditions employed. Solvents disclosed in U.S. Pat. No. 5,229,482 include o-dichlorobenzene, dichlorotoluene, 1,2,4-trichlorobenzene and diphenyl sulfone. In U.S. Pat. No. 5,830,974, monoalkoxybenzenes such as anisole, diphenylether, or phenetole are employed. Solvents of the same types may be used for the preparation of the bis(halophthalimide) intermediates.

Figure 1:
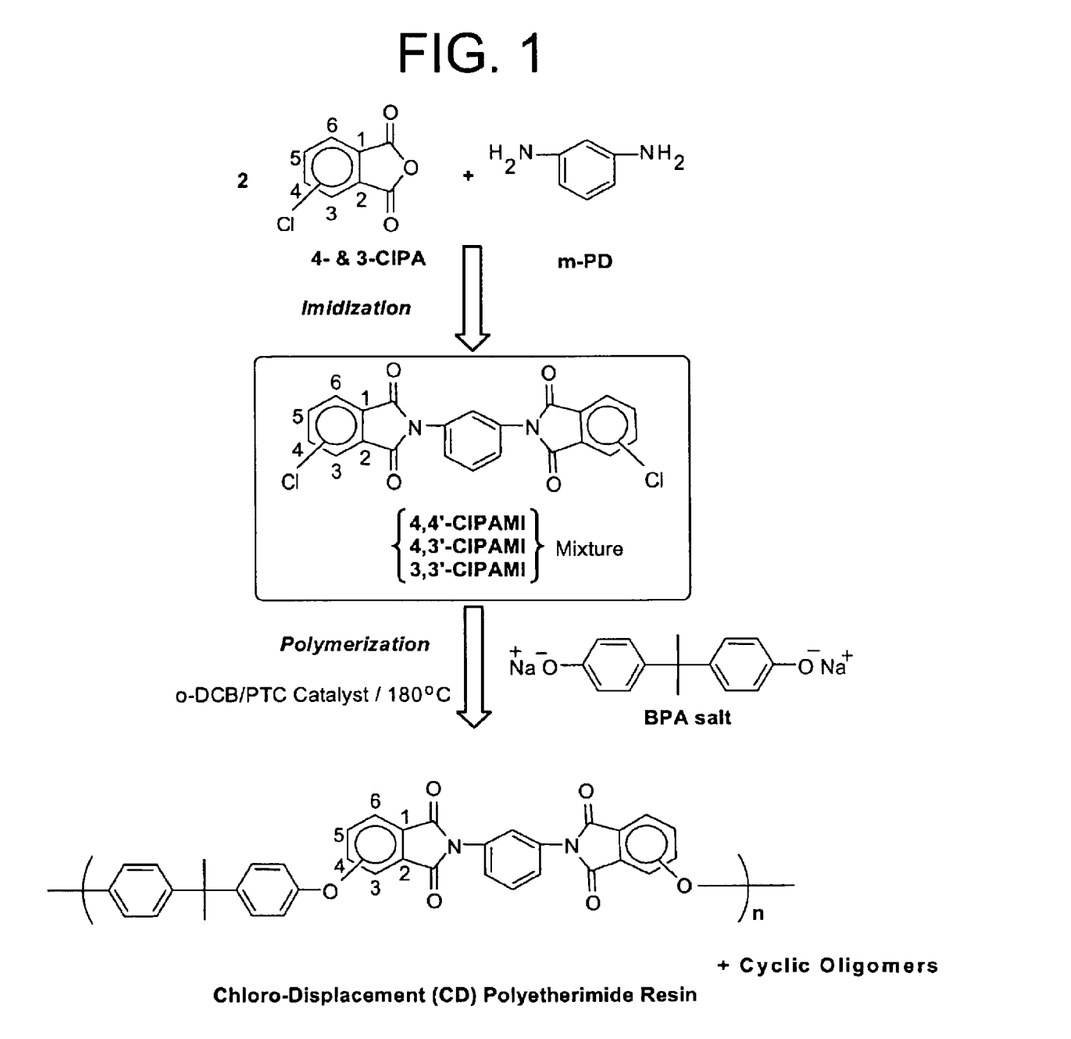
FIG. 1 is an overview of the CIPAMI and polyetherimide synthesis process.

The general scheme for the production of bis(halophthalimide) and the subsequent production of polyetherimide is set forth in FIG. 1. The polyetherimides produced by these displacement polymerizations have a relatively high polydispersivity, ranging from about 3.6 to about 2.6, depending upon the amount of 3-CIPA and 4-CIPA used in preparing the CIPAMI monomer. Polymers made by these methods can have between about 10% and about 15% of a cyclic monomer by-product.

Figure 2:
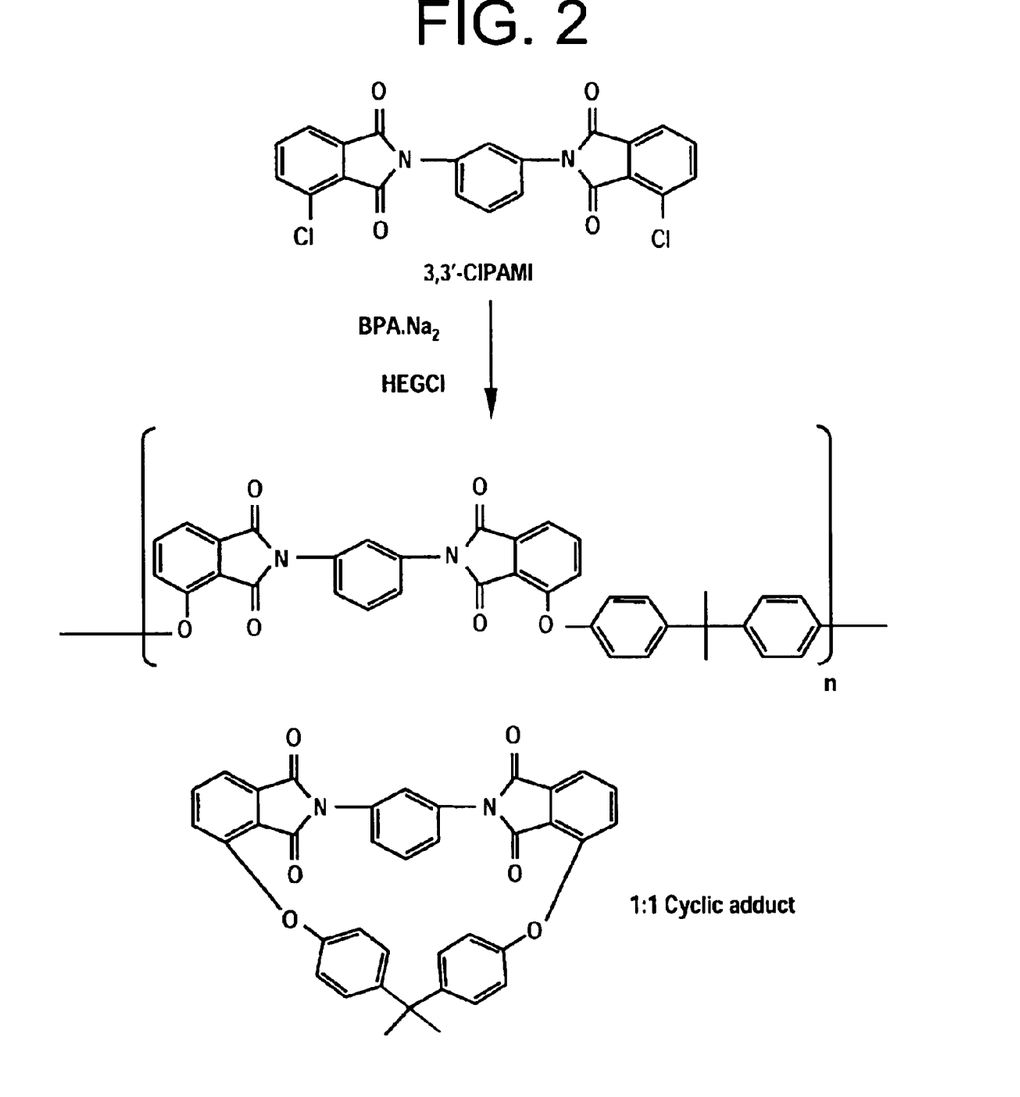
FIG. 2 is a depiction of CIPAMI synthesis demonstrating undesirable cyclic formation.

When bisphenol A, mPD and 4-CIPA are used to produce polyetherimides, it has been found that the level of cyclic oligomers in the final product is about 3%. However, it has been found that the amount of cyclics increases as the level of 3-CIPA is increased as a starting material in CIPAMI synthesis. Where 100% 3-CIPA and mPD are used as the starting material, the amount of cyclic oligomers can range from about 15% to about 20%. Interestingly, it has been found that about two thirds of the cyclic oligomers are a single 1:1 adduct. The reaction scheme demonstrating the use of 3-CIPAMI to produce a polyetherimide with the cyclic oligomer by-product is set forth in FIG. 2.

Other undesirable by-products include short polymer chains and linear oligomers. These by-products, in addition to unreacted monomers, being off specification, must be discarded after separation, increasing the cost and size of the waste stream and reducing the efficiency of the process.

High levels of these low molecular weight species can also have adverse effects on the properties of the resulting polymer. Such negative effects include a lower glass transition temperature (Tg), reduced ductility, and problems with processing including surface appearance, as demonstrated by reduced glossiness.

However, it has also been found that the use of 3-CIPA in combination with other bisphenols and diamines can produce polyetherimides possessing higher Tg (about 15° to about 20° C. higher), and improved flow at high shear. It is therefore desirable to use 3-CIPA as a starting material, at least in part, in the production of polyetherimides.

Means for recovering products from polymerization reactions are known. For example, polymer fractionation processes recover a desired polymer in solid form from a solution by precipitation into an anti-solvent. The process is referred to as total precipitation if the anti-solvent does not dissolve the polymer or low molecular weight species in the polymer such as linear oligomers, cyclic oligomers and monomers. Heptane and other alkanes are examples of anti-solvents which may be used for total precipitation of polymers, especially polyetherimide polymers. However, where such anti-solvents are used, the presence of low molecular weight species in the polymer such as linear oligomers, cyclic oligomers and monomers will result in a product having a higher polydispersivity.

Other methods for recovering polyetherimide polymers include the precipitation of highly polydispersive polymers in toluene, acetone, or tetrahydrofuran, which dissolve low molecular weight species and unreacted monomers from the polymer. Thus, polymers obtained by these methods have reduced polydispersivity.

It is desirable, therefore, to develop a method for preparing polymers which is adapted to the close control of molecular weight and removing unreacted monomers and undesirable by-products by relatively simple means. In the case of polyetherimide polymers, polymers with lower polydispersivity will have improved thermomechanical performance characteristics.

BRIEF DESCRIPTION OF THE INVENTION

The present disclosure is directed to methods for reducing the polydispersivity of a polymer by:

forming a polymer solution;

contacting the polymer solution with an anti-solvent capable of dissolving low molecular weight species but not the desired high molecular weight polymer;

allowing phase separation to occur to obtain a light phase and a heavy phase; and recovering the desired polymer from the heavy phase;

wherein the resulting polymer has reduced polydispersivity.

In one embodiment, the method of the present disclosure includes concentrating and recovering the cyclic and low molecular weight linear oligomers in the light phase.

In another of its aspects, the present disclosure includes methods for reducing the polydispersivity of a polyetherimide resin that include:

forming a polyetherimide solution;

contacting the polyetherimide solution with an anti-solvent capable of dissolving low molecular weight species but not the high molecular weight polyetherimide;

allowing phase separation to occur to obtain a light phase and a heavy phase; and recovering the desired polyetherimide from the heavy phase;

wherein the resulting polyetherimide has reduced polydispersivity.

Another aspect of the present disclosure is to polyetherimide resins with lower polydispersivity produced in accordance with the present disclosure.

DETAILED DESCRIPTION OF THE INVENTION

In accordance with the present disclosure, methods have been developed which lower the polydispersivity of polymers by removing undesirable by-products and unreacted monomers from a polymer solution. The methods of the present disclosure utilize fractionation of a polymer solution with an anti-solvent to remove low molecular weight by-products and unreacted monomers. The anti-solvent, which is preferably admixed with a certain fraction of the polymer solvent, dissolves low molecular weight by-products and unreacted monomers, which enter a light phase, but does not dissolve the polymer, which remains in the heavy phase. Thus, once the two phases are obtained, simple phase separation techniques may be utilized to obtain a heavy phase containing the desired polymer, without the need for precipitation, filtration, washing, etc. that is otherwise required to separate the desired polymer from the undesirable by-products and monomers. The resulting polymer, having had the undesirable low molecular weight by-products and unreacted monomers removed, has a lower polydispersivity.

In one embodiment, the methods of the present disclosure can be used in the synthesis of polyetherimides produced from bisimide monomers which, in turn, are prepared from phthalic anhydrides and diamines. The lower polydispersivity can be achieved by removing low molecular weight species such as short polymer chains, linear oligomers and cyclic oligomers from the desired polymer. While the following disclosure utilizes the preparation of polyetherimides as an example, the methods of the present disclosure may be utilized to reduce the polydispersivity of any polymer placed in solution with an appropriate polymer solvent and anti-solvent pair.

Anhydrides suitable for use in preparing the bishalophthalimides of the present invention have formula (II)

(II)

wherein X is a moiety which may be any organic group that does not interfere with the imidization reaction. In one embodiment X is a displaceable group which participates in a subsequent polymerization reaction. Preferably, X is nitro, nitroso, tosyloxy (—OTs) or halogen; most preferably X is chlorine. Especially preferred anhydrides include 3-chlorophthalic anhydride, 4-chlorophthalic anhydride, and dichlorophthalic anhydride. In a most preferred embodiment, the bis-halophthalimide monomer is made from either substantially pure 3-CIPA or a mixture of 3-CIPA combined with other phthalic anhydride monomers selected from the group consisting of 4-chlorophthalic anhydride, dichlorophthalic anhydride, and substituted analogs thereof where the other positions on the aromatic ring of the anhydride are either hydrogen atoms or substituted with nonreactive groups such as alkyl or aryl groups, and mixtures thereof.

In addition, in one embodiment of the present disclosure, phthalic anhydride (i.e., a compound having the structure of formula (II) wherein X is hydrogen) may be separately added to the reaction mixture. In such a case, the addition of phthalic anhydride to the reaction mixture will provide a mixture comprising both polymerizable monomer and end-capping monomer, i.e., a halophthalimide having only one reactive site which is thus capable of end-capping a growing polymer chain in a polymerization reaction. In such a case, the use of phthalic anhydride to form end-capping monomers may be used to control the molecular weight of the polyetherimide produced in the subsequent polymerization reaction. In addition, as known to those skilled in the art, other anhydrides may be utilized to form end-capping monomers.

Any diamino compound may be employed in the method of this invention. Examples of suitable compounds are ethylenediamine, propylenediamine, trimethylenediamine, diethylenetriamine, triethylenetetramine, heptamethylenediamine, octamethylenediamine, 1,12-dodecanediamine, 1,18-octadecanediamine, 3-methylheptamethylenediamine, 4,4-dimethylheptamethylenediamine, 4-methylnonamethylenediamine, 2,5-dimethylhexamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylenediamine, 5-methyl-4,6-diethyl-1,3-phenylenediamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(β-amino-t-butyl)toluene, bis(p-β-meth yl-o-aminopentyl) benzene, 1,3-diamino-4-isopropylbenzene, bis(4-aminophenyl)sulfone, bis(4-aminophenyl)ether and 1,3-bis (3-aminopropyl)tetramethyldisiloxane. Mixtures of these compounds may also be present. The preferred diamino compounds are aromatic diamines, especially m- and p-phenylenediamine and mixtures thereof.

The production of the bis(halophthalimide) preferably occurs in the presence of a non-polar organic liquid, usually having a substantially lower polarity than that of the dipolar aprotic solvents such as dimethylformamide, dimethylacetamide and N-methylpyrrolidinone. Said non-polar solvent preferably has a boiling point above about 100° C. and most preferably above about 150° C., in order to facilitate the reaction which requires temperatures above that temperature. Suitable liquids of this type include o-dichlorobenzene, dichlorotoluene, 1,2,4-trichlorobenzene, diphenyl sulfone and alkoxybenzenes such as anisole and veratrole, and more generically liquids whose polarity is no higher than those of the aforementioned liquids. Liquids of similar polarity but lower boiling points, such as chlorobenzene, may be employed at super-atmospheric pressures. Anisole and o-dichlorobenzene are usually preferred.

The bis(halophthalimide) preparation method of the invention typically employs temperatures of at least 110° C., preferably in the range from 150° to about 275° C., preferably about 175–225° C. At temperatures below 110° C., reaction rates are for the most part too slow for economical operation. It is within the scope of the invention to employ super-atmospheric pressures, typically up to about 5 atm, to facilitate the use of high temperatures without causing liquid to be lost by evaporation through boiling.

A further feature, for the same reason, is a solids content in the reaction mixture of at least about 5%, preferably at least about 12% and most preferably about 15–25%, by weight. By "solids content" is meant the proportion of bishalophthalimide product as a percentage of the total weight of the bishalophthalimide and solvent. It is further within the scope of the invention to change the solids content during the reaction, for such reasons as to effectuate transfer of the reaction mixture from one vessel to another.

Other constituent proportions in the reaction mixture preferably include, a molar ratio of anhydride to diamine in the range of from about 1.98:1 to about 2.04:1, with a ratio of about 2:1 being most preferred. While other ratios may be employed, a slight excess of anhydride or diamine may be desirable. Catalyst, if used, is present in an amount effective to accelerate the reaction, usually about 0.1–0.3% by weight based on the weight of diamine. Suitable imidization catalysts include, but are not limited to, sodium phenyl phosphinate, acetic acid, benzoic acid, phthalic acid, or substituted derivatives thereof. In one embodiment, sodium phenyl phosphinate is utilized as the imidization catalyst.

The reaction between at least one amine reactant and at least one anhydride reactant by the methods of the present invention results in products generally comprising phthalimides of formula (I). Bis(halophthalimides) which may be produced include 1,3- and 1,4-bis[N-(4-fluorophthalimido)] benzene and 1,3- and 1,4-bis[N-(3-fluorophthalimido)]-benzene; and 4,4'-bis[N-(4-fluorophthalimido)]phenyl ether and 4,4'-bis[N-(3-fluorophthalimido)]phenyl ether; and the corresponding chloro, bromo and nitro compounds. Mixtures of such compounds may also be employed. Especially preferred substituted aromatic compounds of formula I include at least one of 1,3-bis[N-(4-chlorophthalimido)] benzene, 1,4-bis[N-(4-chlorophthalimido)]benzene, 1,3-bis [N-(3-chlorophthalimido)]benzene, 1,4-bis[N-(3-chlorophthalimido)]benzene, 1-[N-(4-chlorophthalimido)]-3[N-(3-chlorophthalimido)benzene, or 1-[N-(4-chlorophthalimido)]4[N-(3-chlorophthalimido)benzene. Where the starting phthalic anhydride is pure 3-CIPA, a 3-3'-CIPAMI as depicted in reaction scheme (II) is produced and then subsequently reacted with additional components to produce the desired polyetherimide. However, as noted above, in other embodiments a mixture of 3-CIPA with other phthalic anhydrides, including 4-CIPA, dichlorophthalic anhydride, and phthalic anhydride, may be utilized to produce the desired halophthalimide which, in turn, is then utilized to produce the desired polyetherimide.

At least one dihydroxy-substituted aromatic hydrocarbon is then reacted with the CIPAMI to produce the desired polyetherimide. Suitable dihydroxy-substituted aromatic hydrocarbons include those having the formula $$HO-A^2-OH, \quad (III)$$

wherein $A^2$ is a divalent aromatic hydrocarbon radical. Suitable $A^2$ radicals include m-phenylene, p-phenylene, 4,4'-biphenylene, 4,4'-bi(3,5-dimethyl)phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438.

The $A^2$ radical preferably has the formula $$-A^3-Y-A^4-, \quad (IV)$$

wherein each of $A^3$ and $A^4$ is a monocyclic divalent aromatic hydrocarbon radical and Y is a bridging hydrocarbon radical in which one or two atoms separate $A^3$ from $A^4$. The free valence bonds in formula IV are usually in the meta or para positions of $A^3$ and $A^4$ in relation to Y. Compounds in which $A^2$ has formula IV are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula IV, the $A^3$ and $A^4$ values may be unsubstituted phenylene or halo or hydrocarbon-substituted derivatives thereof, illustrative substituents (one or more) being alkyl, alkenyl, bromo, chloro. Unsubstituted phenylene radicals are preferred. Both $A^3$ and $A^4$ are preferably p-phenylene, although both may be o- or m-phenylene or one o- or m-phenylene and the other p-phenylene.

The bridging radical, Y, is one in which one or two atoms, preferably one, separate $A^3$ from $A^4$. Illustrative radicals of this type are methylene, cyclohexylmethylene, 2-[2.2.1]-bicycloheptylmethylene, ethylene, isopropylidene, neopentylidene, cyclohexylidene, cyclopentadecylidene, cyclododecylidene and adamantylidene; gem-alkylene (alkylidene) radicals are preferred. Also included, however, are unsaturated radicals.

Some preferred examples of dihydric phenols which may be utilized include 6-hydroxy-1-(4'-hydroxyphenyl)-1,3,3-trimethylindane, 4,4'-(3,3,5-trimethylcyclohexylidene) diphenol; 1,1-bis(4-hydroxy-3-methylphenyl)cyclohexane; 2,2-bis(4-hydroxyphenyl)propane (commonly known as bisphenol-A); 2,2-bis(4-hydroxy-3,5-dimethylphenyl) propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,4'-dihyroxydiphenylmethane; bis(2-hydroxyphenyl)methane; bis(4-hydroxyphenyl) methane; bis(4-hydroxy-5-nitrophenyl)methane; bis(4-hydroxy-2,6-dimethyl-3-methoxyphenyl)methane; 1,1-bis (4-hydroxyphenyl)ethane; 1,1-bis(4-hydroxy-2-chlorophenyl)ethane; 2,2-bis(3-phenyl-4-hydroxyphenyl)-propane; bis(4-hydroxyphenyl)cyclohexylmethane; 2,2-bis (4-hydroxyphenyl)-1-phenylpropane; resorcinol; $C_{1-3}$ alkyl-substituted resorcinols. For reasons of availability and particular suitability for the purposes of this invention, in one embodiment the preferred dihydric phenol is bisphenol A in which the radical of formula IV is the 2,2-bis(4-phenylene)propane radical and in which Y is isopropylidene and $A^3$ and $A^4$ are each p-phenylene.

Preferably, the reaction of salts of dihydroxyaromatic compounds are utilized in the methods of the present disclosure. More preferably, alkali metal salts of dihydroxy-substituted aromatic hydrocarbons are employed. These alkali metal salts are typically sodium or potassium salts, with sodium salts frequently preferred by reason of their availability and relatively low cost. Most preferably, bisphenol A disodium salt ($BPA.NA_2$) is utilized.

In a preferred embodiment, bisphenol A disodium salt is added to the organic solvent and the mixture azeotroped to a dry condition. Then, a second co-monomer, for example a bis[N-(chlorophthalimido)]benzene, may be added and the mixture azeotroped to a dry condition. Then a catalyst may be added as a pre-dried solution in organic solvent. The process is expedited when predried solvent and co-monomers are used.

One class of preferred solvents utilized in producing the polyetherimide includes those of low polarity. Suitable solvents of this type include halogenated aromatic compounds such as o-dichlorobenzene, dichlorotoluene and 1,2,4-trichlorobenzene; and diphenyl sulfone. Solvents of similar polarity but lower boiling points, such as chlorobenzene, may be employed at superatmospheric pressures. Another class of preferred solvents includes aromatic ethers such as diphenyl ether, phenetole (ethoxybenzene), and anisole (methoxybenzene). O-dichlorobenzene and alkoxybenzenes, most preferably anisole, are particularly preferred. In many instances, halogenated aromatic solvents are preferred over alkoxybenzenes since the former have less tendency than the latter to interact with and inactivate the phase transfer catalyst described below. Another class of solvents suitable for the present invention is polar aprotic solvents, illustrative examples of which include dimethylformamide (DMF), dimethylacetamide (DMAc), dimethylsulfoxide (DMSO), and N-methylpyrrolidinone (NMP).

The preferred phase transfer catalysts, by reason of their exceptional stability at high temperatures and their effectiveness to produce high molecular weight aromatic polyether polymers in high yield are the hexaalkylguanidinium and α,ω-bis(pentaalkylguanidinium)alkane salts. For the sake of brevity, both types of salts are hereinafter sometimes designated "guanidinium salt".

Suitable guanidinium salts are illustrated by those of the formula (V)

wherein:
each of $R^2$, $R^3$, $R^4$, $R^5$ and $R^6$ is a primary alkyl radical and $R^7$ is a primary alkyl or bis(primary alkylene) radical, or at least one of the $R^2$—$R^3$, $R^4$—$R^5$ and $R^6$—$R^7$ combinations with the connecting nitrogen atom forms a heterocyclic radical;
$X^2$ is an anion; and
n is 1 or 2.

The alkyl radicals suitable as $R^{2-6}$ include primary alkyl radicals, generally containing about 1–12 carbon atoms. $R^7$ is usually an alkyl radical of the same structure as $R^{2-6}$ or a $C_{2-12}$ alkylene radical in which the terminal carbons are primary; most preferably, it is $C_{2-6}$ alkyl or $C_{4-8}$ straight chain alkylene. Alternatively, any combination of $R^{2-7}$ and the corresponding nitrogen atom(s) may form a heterocyclic radical such as piperidino, pyrrolo or morpholino.

The $X^2$ value may be any anion and is preferably an anion of a strong acid; examples are chloride, bromide and methanesulfonate. Chloride and bromide ions are usually preferred. The value of n will be 1 or 2 depending on whether $R^7$ is alkyl or alkylene.

As can be seen in formula V, the positive charge in the guanidinium salt is delocalized over one carbon and three nitrogen atoms. This is believed to contribute to the salts' stability under the relatively high temperature conditions encountered in embodiments of the invention.

Additionally, the reaction is typically sensitive to water and it is preferable to dry the solvent-comprising reaction mixture by known methods, for example by boiling or azeotroping water from the mixture, typically prior to delivering the catalyst. In one embodiment, water removal from the system can be accomplished in either batch, semi-continuous or continuous processes using means well-known in the art such as a distillation column in conjunction with one or more reactors. In one embodiment, a mixture of water and non-polar organic liquid distilling from a reactor is sent to a distillation column where water is taken off overhead and solvent is recycled back into the reactor at a rate to maintain or increase the desired solids concentration. Other methods for water removal include, but are not limited to, passing the condensed distillate through a drying bed for chemical or physical adsorption of water.

Once the formation of the desired resin has occurred, the polymer solution, e.g., polyetherimide in o-DCB, is placed in contact with an anti-solvent which is capable of dissolving low molecular weight species such as unreacted monomers, and undesirable products such as cyclic oligomers and/or linear oligomers. The anti-solvent does not, however, dissolve the polymer, e.g., the polyetherimide. Suitable anti-solvents for use in accordance with the present disclosure include toluene, ketones, preferably acetone, tetrahydrofuran, xylenes, dioxane, etc.

In those cases where the polymer is not already in solution, a suitable solvent may be added to the polymer to produce a polymer solution for fractionation. Such solvents include, but are not limited to, o-DCB, trichlorobenzene, anisole, and veratrole. Once the polymer solution has been formed, the anti-solvent is added as described above.

In one embodiment, the polyetherimide solution is heated to a temperature ranging from about 50° C. to about 180° C., preferably from about 80° C. to about 110° C., with a temperature of from about 90° C. to about 100° C. being most preferred.

While stirring, an anti-solvent such as toluene is added. It is desirable to add the maximum amount of anti-solvent without precipitation of the solid polymer. Preferably, the anti-solvent is added in an amount ranging from about 1/10 to about 1/2 by weight of the solvent in the polymer solution, more preferably in an amount equal to about 1/3 by weight of the solvent in the polymer solution.

Once the anti-solvent has been added, the solution is preferably heated to a temperature ranging from about 100° C. to about 180° C., preferably from about 135° ° C. to about 150° C., with a range of from about 140° C. to about 145° C. being most preferred. Stirring is stopped and the polymer solution is allowed to cool. Phase separation starts to occur and is complete in about 1 to about 2 hours.

The phases may then be separated by methods known to those skilled in the art including, but not limited to, settling. For polyetherimides, two phases are obtained after separation: the light phase of o-DCB and toluene is rich in cyclic and linear oligomers; the heavy phase contains about 20–25% solids, including the desired polymer.

The level of reduction in the polydispersivity of the resulting polymers is directly related to the amount of anti-solvent used. In this manner, the polydispersivity of the polymer may be reduced. For example, in the case of polyetherimides, the resulting polyetherimide preferably has a reduced polydispersivity. In one embodiment, the polydispersivity ranges from about 1.5 to about 2.5, more preferably from about 2.0 to about 2.3.

Polyetherimide resins produced in accordance with the methods of the present disclosure have improved thermo-mechanical performance characteristics such as glass transition temperature (Tg) or heat deflection temperature (HDT).

In one embodiment, the method of the present disclosure includes concentrating and recovering the cyclic and low molecular weight linear oligomers from the light phase for use in other applications such as re-equilibration to high molecular weight polymer or in processes where improved flow is needed.

The present disclosure is illustrated by the following non-limiting examples.

EXAMPLE 1

Four samples of a polyetherimide solution produced by reacting bisphenol-A salt with a CIPAMI produced by reacting mPD and 3-CIPA were prepared. 70:30 compositions were prepared by dissolving the polyetherimide in o-DCB and heating it to 180° C. with stirring to obtain a solution having a concentration of 10% solids. 5 grams of a 10% polymer solution (0.5 g polymer in 4.5 g o-DCB) were prepared with varying amounts (0.3, 0.5, 1.0 and 1.5 g) of toluene as an anti-solvent. The samples and the amounts of toluene used are set forth below in Table 1.

TABLE 1

Sample designation for toluene induced fractionation of a o-DCB CIPAMI polymer solution

| Material | Sample | Wt. Toluene (g)/5 g. 10% polymer solution |
|---|---|---|
| Light Phase | 1 | 0.3 |
|  | 2 | 0.5 |
|  | 3 | 1.0 |
|  | 4 | 1.5 |

The polyetherimide solution was heated to a temperature ranging from 90° C. to 100° C. While stirring, toluene was added to each sample in the amounts noted above. The solution was then heated to a temperature from 140° C. to 145° C. to clear any turbidity. Stirring was stopped and the polymer solution was allowed to cool. Phase separation started to occur and was complete in about 1 to about 2 hours. In each case the solution fractionated into two phases—one light and one heavy.

The light and heavy phases obtained from each sample were then subjected to gel permeation chromatography (GPC) analysis. GPC analysis for high polymer was performed by using chloroform as eluent (elution rate of 0.8 ml-min-1) on a HP 1100 Series apparatus equipped with a PL gel 5 um Mixed-C column and a UV detector utilizing the manufacturer's software. The % cyclics analyses were determined on a Polymer Labs HT-120 GPC system equipped with a PL gel Mixed-C column and UV detector, using chloroform as an eluent at 0.7 mL/min and utilizing Perkin Elmer Turbochrom software. Table 2 summarizes the GPC results.

TABLE 2

Detailed GPC analysis of light and heavy samples of fractionated CIPAMI polymer

| Material | Sample | Mw (K) | PDI | % Cyclics | | | | | |
|---|---|---|---|---|---|---|---|---|---|
| | | | | Mono | Di- | Tri- | Tetra- | Penta- | Total |
| Original | 10% soln. | 54.1 | 2.79 | 0.72 | 1.25 | 0.44 | 0.21 | 0.17 | 2.79 |
| Light Phase | 1 | 20.77 | 2.74 | 0.22 | 0.44 | 0.17 | 0.09 | 0.09 | 0.99 |
|  | 2 | 16.57 | 2.66 | 0.32 | 0.8 | 0.35 | 0.19 | 0.15 | 1.81 |
|  | 3 | 11.04 | 2.4 | 3.76 | 5.78 | 2.09 | 0.93 | 0.79 | 13.35 |
|  | 4 | 8.43 | 2.25 | 3.2 | 5.4 | 2.04 | 0.95 | 0.82 | 12.41 |

TABLE 2-continued

Detailed GPC analysis of light and heavy samples of fractionated CIPAMI polymer

| Material | Sample | Mw (K) | PDI | % Cyclics | | | | | |
| --- | --- | --- | --- | --- | --- | --- | --- | --- | --- |
| | | | | Mono | Di- | Tri- | Tetra- | Penta- | Total |
| Heavy Phase | 1 | 58.99 | 2.46 | 0.66 | 1.05 | 0.45 | 0.21 | 0.16 | 2.53 |
| | 2 | 58.25 | 2.37 | 0.33 | 0.6 | 0.22 | 0.11 | 0.09 | 1.35 |
| | 3 | 56.3 | 2.43 | 0.28 | 0.56 | 0.21 | 0.11 | 0.08 | 1.24 |
| | 4 | 57.4 | 2.23 | 0.38 | 0.67 | 0.26 | 0.13 | 0.1 | 1.54 |

As can be seen from Table 2, the polydispersivity narrowed as the amount of toluene increased. There was a slight increase in the weight average molecular weight of the polymer as the polydispersivity was reduced. Moreover, as the amount of toluene increased, the Mw of the extracted polymer in the light phase was reduced. The total amount of cyclics in the heavy phase was reduced as additional cyclics were found in the light phase. As is apparent from Table 2, the volume of the light phase increased with the amount of toluene used. Therefore, heavy phase from sample 4 had the most concentrated polymer sample.

EXAMPLE 2

Three different polyetherimide resins were produced by reacting a bisphenol-A salt with a CIPAMI monomer prepared from 70:30 4/3-CIPA and mPD (designated as samples 5, 6 and 7 in Table 3). Another sample was prepared by reacting a bisphenol-A salt with a CIPAMI monomer produced from 3-CIPA and mPD (designated as sample 8 in Table 4). Samples were fractionated by the addition of toluene and polydispersivity determined following the methods of Example 1.

TABLE 3

Large Scale PDF fractionation of mixed CIPAMI based polymers

| Sample | CIPAMI % Composition 4/3-CIPA | Polymer Before Fractionation | | Polymer After Fractionation | |
| --- | --- | --- | --- | --- | --- |
| | | Mw (K) | PDI | Mw (K) | PDI |
| 5 | 70:30 | 49.9 | 2.73 | 55.9 | 2.19 |
| 6 | 70:30 | 54.6 | 2.75 | 58.4 | 2.27 |
| 7 | 70:30 | 46.5 | 2.8 | 50.9 | 2.07 |

TABLE 4

Fractionation results of all 3-CIPAMI based polymer

| Sample 8 | Mw (K) | PDI | % Cyclic Monomer | % Total Cyclics |
| --- | --- | --- | --- | --- |
| Polymer as made | 53.7 | 3.71 | 10.4 | 13.2 |
| Heavy Phase | 58.5 | 2.42 | 3.0 | 3.9 |
| Light Phase | 5.1 | — | 65 | 83 |

Table 3 demonstrates the results of the fractionation and the ability of the present methods to lower the polydispersivity of the samples. As is apparent from Table 4, the 3-CIPA based polyetherimide possessed a large amount of cyclics, which were successfully separated by the methods of the present invention.

As is also apparent from the above, the level of reduction in the polydispersivity of the resulting polymers was directly related to the amount of toluene used.

While the disclosure has been illustrated and described in typical embodiments, it is not intended to be limited to the details shown, since various modifications and substitutions can be made without departing in any way from the spirit of the present disclosure. For example, while much of the specification describes the fractionation of a polymer solution containing a polyetherimide and its undesirable side products and unreacted monomers, the methods of the present disclosure can be utilized to fractionate any polymer solution and thereby lower the polydispersivity of the desired polymer. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A method for reducing the polydispersivity of a high molecular weight polyetherimide resin comprising:

forming a polyetherimide solution using a solvent selected from the group consisting of o-dichlorobenzene and anisole;

contacting the polyetherimide solution with an anti-solvent selected from the group consisting of toluene, ketones, acetone, tetrahydrofuran, xylenes, and dioxane wherein the anti-solvent is capable of dissolving low molecular weight species but not the high molecular weight polyetherimide;

allowing phase separation to occur to obtain a light phase and a heavy phase; and recovering the desired polyetherimide from the heavy phase, wherein the resulting polyetherimide possessed a polydispersivity ranging from about 1.5 to about 2.5.

2. The method of claim 1 wherein the step of forming a polyetherimide resin further comprises forming a polyetherimide by reacting a bis-halophthalimide with at least one alkali metal salt of a dihydroxy-substituted aromatic compound in the presence of a phase transfer catalyst.

3. The method of claim 2 wherein the step of forming the polyetherimide comprises reacting a bis-halophthalimide produced by reacting a diamino compound with an anhydride having the following formula (II)

wherein X is selected from the group consisting of nitro, nitroso, tosyloxy, halogen and mixtures thereof, with at least one alkali metal salt of a dihydroxy-substituted aromatic compound in the presence of a phase transfer catalyst.

4. The method of claim 2 wherein the step of forming the polyetherimide comprises reacting a bis-halophthalimide produced by reacting a diamino compound with an anhydride selected from the group consisting of 3-chlorophthalic anhydride, 4-chlorophthalic anhydride, dichloro phthalic anhydride, phthalic anhydride and mixtures thereof, with at least one alkali metal salt of a dihydroxy-substituted aromatic compound in the presence of a phase transfer catalyst.

5. The method of claim 4 wherein the step of forming the polyetherimide comprises reacting the anhydride with a diamino compound selected from the group consisting of ethylenediamine, propylenediamine, trimethylenediamine, diethylenetriamine, triethylenetetramine, heptamethylenediamine, octamethylenediamine, 1,12-dodecanediamine, 1,18-octadecanediamine, 3-methylheptamethylenediamine, 4,4-dimethylheptamethylenediamine, 4-methylnonamethylenediamine, 2,5-dimethylhexamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylenediamine, 5-methyl-4,6-diethyl-1,3-phenylenediamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(β-amino-t-butyl)toluene, bis(p-α-methyl-o-aminopentyl)benzene, 1,3-diamino-4-isopropylbenzene, bis(4-aminophenyl)sulfone, bis(4-aminophenyl)ether, 1,3-bis(3-aminopropyl)tetramethyldisiloxane and mixtures thereof.

6. The method of claim 3 wherein the step of forming the polyetherimide comprises reacting a bis-halophthalimide produced by reacting an anhydride with a diamino compound selected from the group consisting of m-phenylenediamine and p-phenylenediamine, with at least one alkali metal salt of a dihydroxy-substituted aromatic compound in the presence of a phase transfer catalyst.

7. The method of claim 2 wherein the step of forming the polyetherimide resin further comprises forming a polyetherimide by reacting a halophthalimide with bisphenol A disodium salt.

8. The method of claim 2 wherein the step of forming the polyetherimide resin further comprises reacting a halophthalimide with at least one alkali metal salt of a dihydroxy-substituted aromatic compound in the presence of a phase transfer catalyst selected from the group consisting of hexaalkylguanidinium alkane salts and α,ω-bis(pentaalkylguanidinium)alkane salts.

9. The method of claim 1 wherein the step of forming the polyetherimide solution further comprises heating the polyetherimide solution to a temperature ranging from about 50° C. to about 180° C.

10. The method of claim 1 wherein the step of forming the polyetherimide solution further comprises heating the polyetherimide solution to a temperature ranging from about 80° C. to about 110°.

11. The method of claim 1 wherein the step of contacting the polyetherimide solution with the anti-solvent comprises adding anti-solvent in an amount ranging from about 1/10 to about 1/2 by weight of the solvent in the polyetherimide solution.

12. The method of claim 1 wherein the step of contacting the polyetherimide solution with the anti-solvent comprises adding anti-solvent in an amount of about 1/3 by weight of the solvent in the polyetherimide solution.

13. The method of claim 1 wherein the step of contacting the polyetherimide solution with the anti-solvent further comprises heating to a temperature ranging from about 100° C. to about 180° C.

14. The method of claim 1 wherein the step of contacting the polyetherimide solution with the anti-solvent further comprises heating to a temperature ranging from about 135° C. to about 150° C.

15. A polyetherimide resin produced in accordance with the method of claim 1.

16. A for reducing the polydispersivity of a high molecular weight polyetherimide resin comprising:

forming a polyetherimide solution using a solvent selected from the group consisting of o-dichlorobenzene and anisole and by reacting a diamino compound selected from the group consisting of m-phenylenediamine and p-phenylenediamine with an anhydride selected from the group consisting of 3-chlorophthalic anhydride, 4-chlorophthalic anhydride, dichloro phthalic anhydride, phthalic anhydride and mixtures thereof to produce a halophthalimide, and then reacting the halophthalimide with bisphenol A disodium salt in the presence of a phase transfer catalyst selected from the group consisting of hexaalkylguanidinium alkane salts or a α,ω-bis(pentaalkylguanidinium)alkane salts:

contacting the polyetherimide solution with an anti-solvent capable of dissolving low molecular weight species but not the high molecular weight polyetherimide selected from the group consisting of toluene, ketones, acetone, tetrahydrofuran, xylenes, and dioxane:

allowing phase separation to occur to obtain a light phase and a heavy phase; and recovering the desired polyetherimide from the heavy phase, wherein the resulting polyetherimide possessed a polydispersivity ranging from about 1.5 to about 2.5.

17. The method of claim 16 wherein the step of forming the polyetherimide solution further comprises heating the polyetherimide solution to a temperature ranging from about 50° C. to about 180° C.

18. The method of claim 16 wherein the step of forming the polyetherimide solution further comprises heating the polyetherimide solution to a temperature ranging from about 80° C. to about 110°.

19. The method of claim 16 wherein the step of contacting the polyetherimide solution with the anti-solvent comprises adding anti-solvent in an amount ranging from about 1/10 to about 1/2 by weight of the solvent in the polyetherimide solution.

20. The method of claim 16 wherein the step of contacting the polyetherimide solution with the anti-solvent comprises adding anti-solvent in an amount of about 1/3 by weight of the solvent in the polyetherimide solution.

21. The method of claim 16 wherein the step of contacting the polyetherimide solution with the anti-solvent further comprises heating to a temperature ranging from about 100° C. to about 180° C.

22. The method of claim 16 wherein the step of contacting the polyetherimide solution with the anti-solvent further comprises heating to a temperature ranging from about 135° C. to about 150° C.

23. A polyetherimide resin produced in accordance with the method of claim 16.

* * * * *